(12) United States Patent
Arbatli

(10) Patent No.: US 11,768,142 B1
(45) Date of Patent: Sep. 26, 2023

(54) BUBBLE DETECTION SYSTEM AND METHOD WITHIN A LIQUID FLOW OF A PIPE BY SENSING CHANGES IN LOCAL LIQUID PRESSURE

(71) Applicant: Mehmet Arbatli, Tomball, TX (US)

(72) Inventor: Mehmet Arbatli, Tomball, TX (US)

( * ) Notice: Subject to any disclaimer, the term of this patent is extended or adjusted under 35 U.S.C. 154(b) by 383 days.

(21) Appl. No.: 17/227,798

(22) Filed: Apr. 12, 2021

(51) Int. Cl.
*G01N 15/00* (2006.01)
*G01N 21/85* (2006.01)

(52) U.S. Cl.
CPC .............. *G01N 15/00* (2013.01); *G01N 21/85* (2013.01); *G01N 2015/0011* (2013.01)

(58) Field of Classification Search
CPC .................................. G01N 15/00; G01N 3/18
See application file for complete search history.

(56) References Cited

U.S. PATENT DOCUMENTS

| | | | |
|---|---|---|---|
| 3,812,482 A | 5/1974 | Clark | |
| 4,662,540 A * | 5/1987 | Schroter | G01P 13/0066 137/12 |
| 4,763,525 A | 8/1988 | Cobb | |
| 5,083,862 A | 1/1992 | Rusnak | |
| 5,182,938 A * | 2/1993 | Merkel | G01N 11/08 73/19.05 |
| 5,455,423 A | 10/1995 | Mount et al. | |
| 5,960,129 A | 9/1999 | Kleinschmitt | |
| 7,231,805 B2 * | 6/2007 | Bretmersky | G01N 33/18 73/19.01 |
| 10,352,866 B1 | 7/2019 | Arbatli | |
| 2006/0090538 A1 * | 5/2006 | Bretmersky | G01N 33/18 73/19.1 |
| 2010/0133189 A1 * | 6/2010 | Maierhofer | A61M 1/1656 210/93 |

FOREIGN PATENT DOCUMENTS

| | | | | |
|---|---|---|---|---|
| JP | 6666275 B2 * | 3/2020 | | A61M 5/168 |
| WO | WO 2017201451 | 11/2017 | | |

OTHER PUBLICATIONS

Machine Translation of JP-6666275-B2 (Year: 2020).*

* cited by examiner

*Primary Examiner* — Nathaniel J Kolb
(74) *Attorney, Agent, or Firm* — Michael Diaz

(57) ABSTRACT

A system for detecting bubbles within a liquid flowing in an interior of a pipe. The system includes a system for detecting bubbles within a liquid flowing in an interior of a pipe. The system includes a pressure sensor affixed to the interior of the pipe and a microcontroller communicating with the pressure sensor. The pressure sensor gathers pressure readings of the liquid flowing in the pipe at the location of the pressure sensor and sends the gathered pressure readings to the microprocessor. A pressure differential range over a specific period of time is selected which when exceeded, indicates the presence of bubbles in the liquid flowing in the pipe. The pressure differential range is utilized by the microcontroller to determine the presence of bubbles in the fluid flowing through the pipe. The microcontroller determines a presence of bubbles in the liquid based on an exceedance of the pressure differential range from pressure readings gathered by the pressure sensor over the selected period of time.

11 Claims, 6 Drawing Sheets

Go to FIG. 5B

BUBBLE DETECTION SYSTEM AND METHOD WITHIN A LIQUID FLOW OF A PIPE BY SENSING CHANGES IN LOCAL LIQUID PRESSURE

BACKGROUND OF THE INVENTION

Field of the Invention

This invention relates to detectors. Specifically, and not by way of limitation, the present invention relates to a system and method for detecting bubbles within a liquid flow in a pipe through the sensing of changes in local liquid pressure.

Description of the Related Art

At times it is necessary or advantageous to determine if bubbles are present in a specific liquid within a pipe or other type of conduit. In one example, the analysis of blood is used to determine the presence of bubbles which may attach to blood or form air emboli which can be very harmful to patients. In various other applications and industry, it is desirable to be aware of the existence of bubbles in a liquid.

There are some existing detectors being utilized in detecting bubbles. One such detector filed and issued to the present inventor is U.S. Pat. No. 10,352,866 to Arbatli which discloses a transmitter directing a directed light and an optical detector for determining if bubbles are present. In addition, although there are no known prior art teachings of an apparatus or method such as that disclosed herein, prior art references that discusses subject matter that bears some relation to matters discussed herein are Patent Cooperation Treaty (PCT) Publication WO2017201451 to Knollenberg et al. (Knollenberg), U.S. Pat. No. 5,083,862 to Rusnak (Rusnak), U.S. Pat. No. 5,960,129 to Kleinschmitt (Kleinschmitt), U.S. Pat. No. 4,763,525 to Cobb (Cobb), and U.S. Pat. No. 3,812,482 to Clark (Clark). All of these prior art references do not teach or suggest using a pressure sensor for gathering local pressure readings and analyzing these readings to determine the presence of bubbles in the flowing fluid.

It would be advantageous to have a system and method by which local pressure is measured and analyzed for determining the presence of bubbles. It is an object of the present invention to provide such a system and method.

SUMMARY OF THE INVENTION

In one aspect, the present invention is a system for detecting bubbles within a liquid flowing in an interior of a pipe. The system includes a pressure sensor affixed to the interior of the pipe and a microcontroller communicating with the pressure sensor. The pressure sensor gathers pressure readings of the liquid flowing in the pipe at the location of the pressure sensor and sends the gathered pressure readings to the microprocessor. A pressure differential range over a specific period of time is selected which when exceeded, indicates the presence of bubbles in the liquid flowing in the pipe. The pressure differential range is utilized by the microcontroller to determine the presence of bubbles in the fluid flowing through the pipe. The microcontroller determines a presence of bubbles in the liquid based on an exceedance of the pressure differential range from pressure readings gathered by the pressure sensor over the selected period of time.

In another aspect, the present invention is a method of detecting bubbles within a liquid flowing in an interior of a pipe. The method begins by affixing a pressure sensor to the interior of the pipe. Next pressure readings are gathered by the pressure sensor of the liquid flowing in the interior of the pipe. The gathered pressure readings are then sent to a microcontroller. A pressure differential range over a specific period of time is established by which exceedance of the pressure differential range indicates the presence of bubbles. The microcontroller determines a presence of bubbles in the liquid based on the exceedance of the pressure differential range from the gathered pressure readings of the pressure sensor for the preselected period of time.

BRIEF DESCRIPTION OF THE DRAWINGS

FIGS. 5A and 56 are flow charts illustrates the steps of detecting bubbles in the pipe using the detection system according to the teachings of the present invention.

DESCRIPTION OF THE INVENTION

Figure 1:
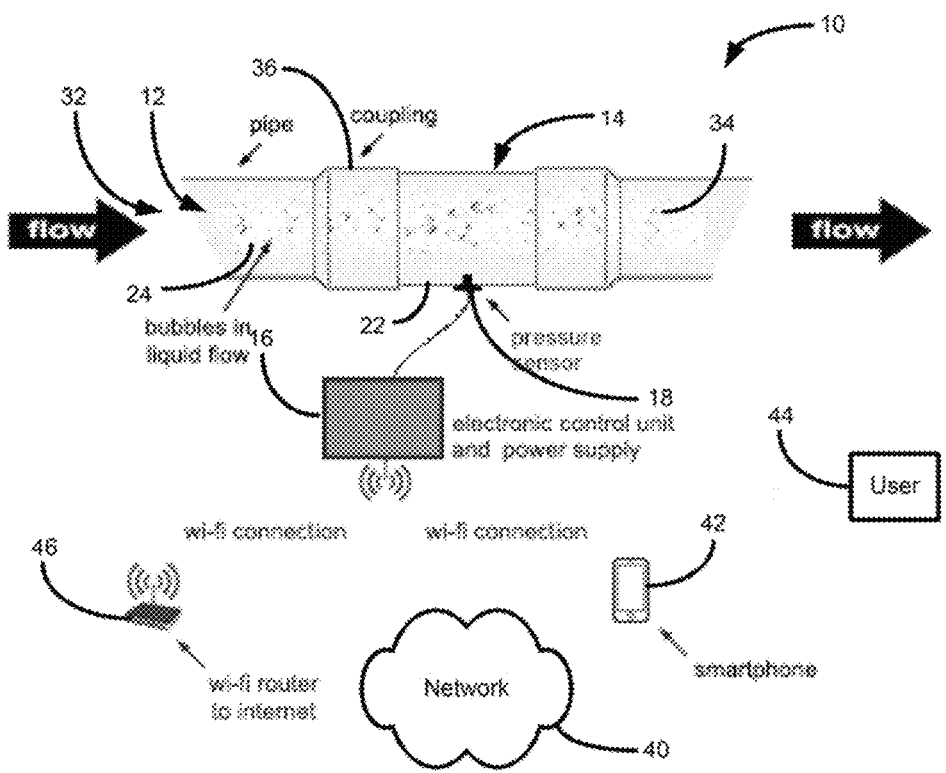
FIG. 1 is a simplified block diagram illustrating major components of a detection system for detecting bubbles within a liquid flow in a pipe.
Figure 2:
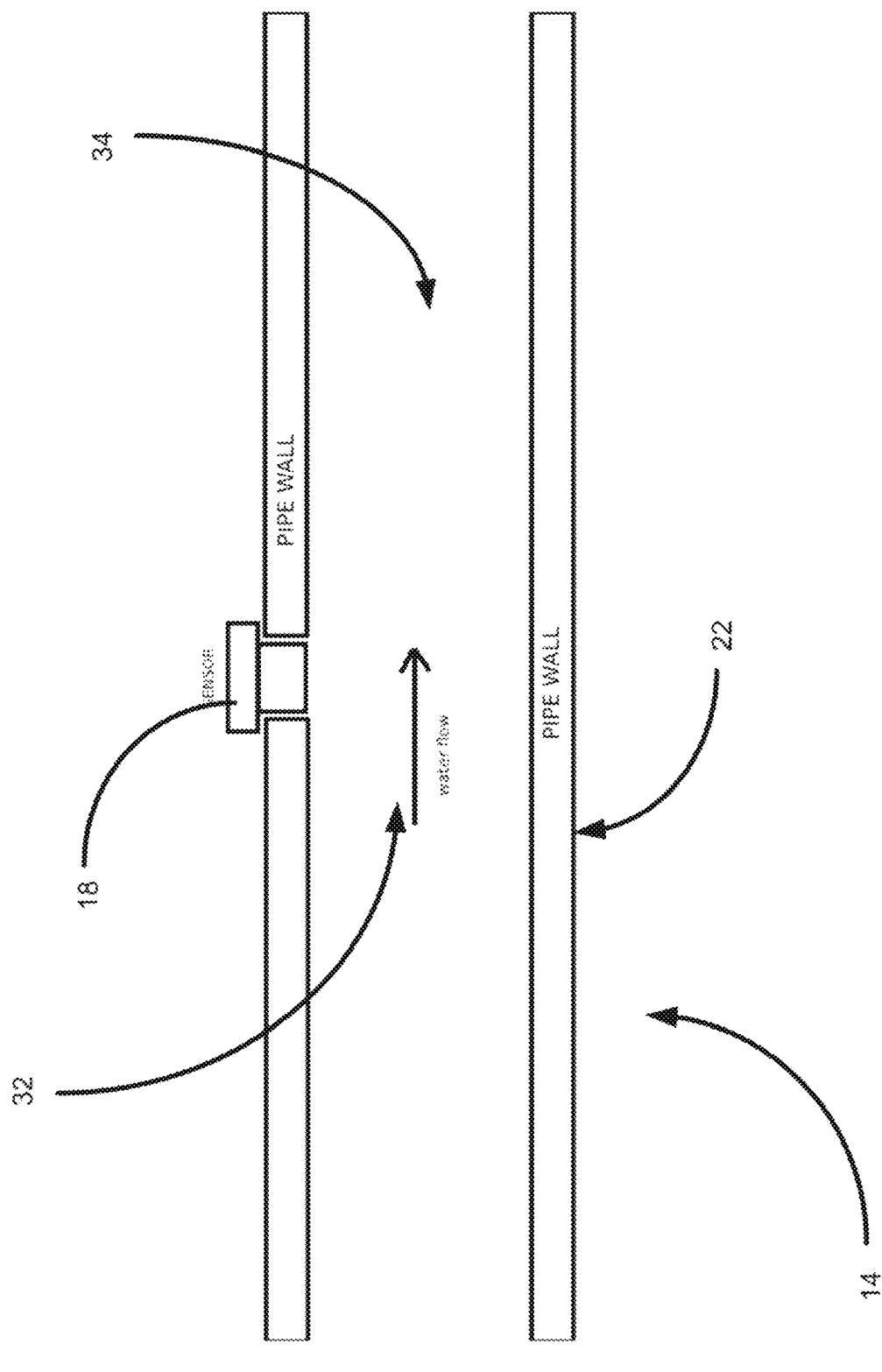
FIG. 2 illustrates a side view of the pressure sensor 18 embedded in the wall of the pipe.

The present invention is a system and method of detecting bubbles within a liquid flow in a pipe. FIG. 1 is a simplified block diagram illustrating major components of a detection system 10 for detecting bubbles 24 within a liquid 12 flow in a pipe 14. The system includes an electronic control unit 16 communicating with one or more pressure sensors 18. The pressure sensor 18 is affixed to an interior 34 of the pipe 14. The pressure sensor may be any device capable of measuring a pressure of a fluid. One example of such a pressure sensor is the MS5837-30BA manufactured by TE Connectivity. Such a sensor provides an optimized solution for measuring pressure at various water depths in a small module. However, it should be understood that any sensor providing accurate pressure readings in a fluid may be utilized in the present invention. FIG. 2 illustrates a side view of the pressure sensor 18 embedded in the wall of the pipe 14. The pressure sensor is affixed on the wall with the sensor facing the interior of the pipe for measuring the fluid pressure. The electronic control unit 16 and the pressure sensor 18 are powered by a power supply 30. The power supply 30 may be separate units or utilize the same unit to power the electronic control unit 16 and the pressure sensor 18. The pressure sensor 18 is used to determine the local pressure of the liquid at a specific point in the pipe 14. The pipe may be any conduit allowing a flow of the liquid 12. The pipe 14 includes a flow 32 through an interior 34 of the pipe. As illustrated, the pipe may include one or more couplings 36. In one embodiment of the present invention, the electronic control unit 16 may communicate through a wi-fi router 46 to a network 40, such as the Internet to a personal communication device (e.g., a mobile phone 42). A user 44 may send inputs, such as commands and parameters, and receive information through the mobile phone 42 from the electronic control unit 16.

Figure 3:
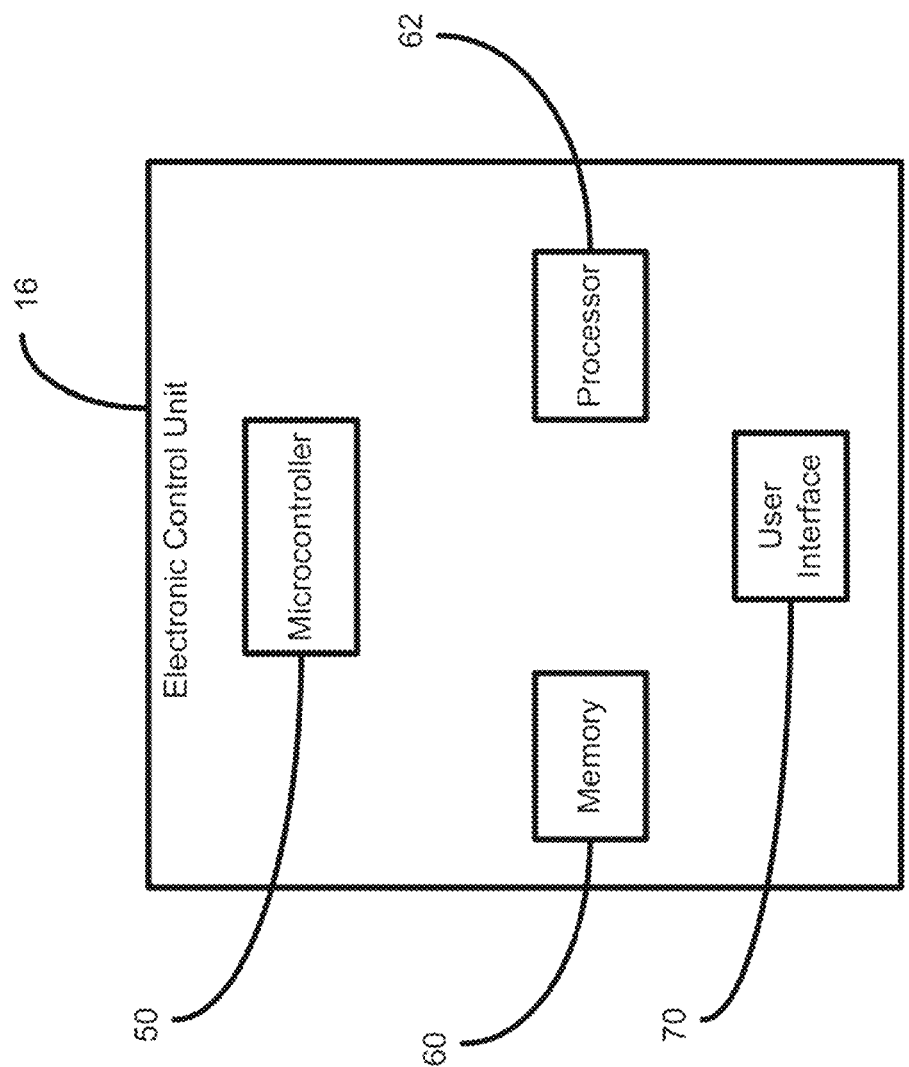
FIG. 3 is a simplified block diagram illustrating the components of the electronic control unit in one embodiment of the present invention.

FIG. 3 is a simplified block diagram illustrating the components of the electronic control unit 16 in one embodiment of the present invention. The electronic control includes a microcontroller 50 which may also include a memory 60 for storing a set of instructions and a processor 62 for executing the instructions. The processer 62 may access information from, and store information in a nonremovable memory, a removable memory, or a combination thereof, also collectively referred to herein as computer readable media. Illustrative nonremovable memory may consist of RAM, ROM, a hard disk, or other well-known memory storage technologies. Illustrative removable memory may consist of one or more Subscriber Identity Module (SIM) cards, or other well-known memory storage technologies, such as "smart cards," magnetic disks, floppy disks, optical disks, magneto-optical disks, magnetic tapes, or any suitable non-volatile memory. As will be discussed below, the set of instructions executed by the processor permit the control of the microcontroller 50. The electronic control unit 16 may also include a user interface 70 for interfacing with the user 44. The user interface may provide a Guided User Interface (GUI) for display on the mobile phone 42 or other communication device utilized by the user 44. The user interface 70 enables the user 44 to receive information from the electronic control unit 16 as well as allow the user to send commands to the electronic control unit 16.

The pipe 14 includes a flow 32 of liquid 12 within its interior 34. The pipe includes at least one pressure sensor for sensing the local pressure of the liquid 12 at the pressure sensor 18. The pressure sensor continuously senses the changes in local liquid pressure. The differences in pressure determine whether the flow is a fully saturated clean liquid flow or a flow interrupted by air bubbles. A pressure differential range is the differential from a baseline value which could be an average value over a period of time. This pressure differential range is analyzed to determine if bubbles are present in the flowing liquid in the pipe or conduit. The present invention preferably continuously collects pressure readings from the pressure sensor and sends it to the microcontroller 50 and processor 62. In one embodiment, the information gathered from the pressure sensor 18 is sent via the Wi-Fi router 46 or other wireless connection. The processor than analyzes the data and determines if interruptions in the liquid flow is caused by passing air bubbles.

Figure 4:
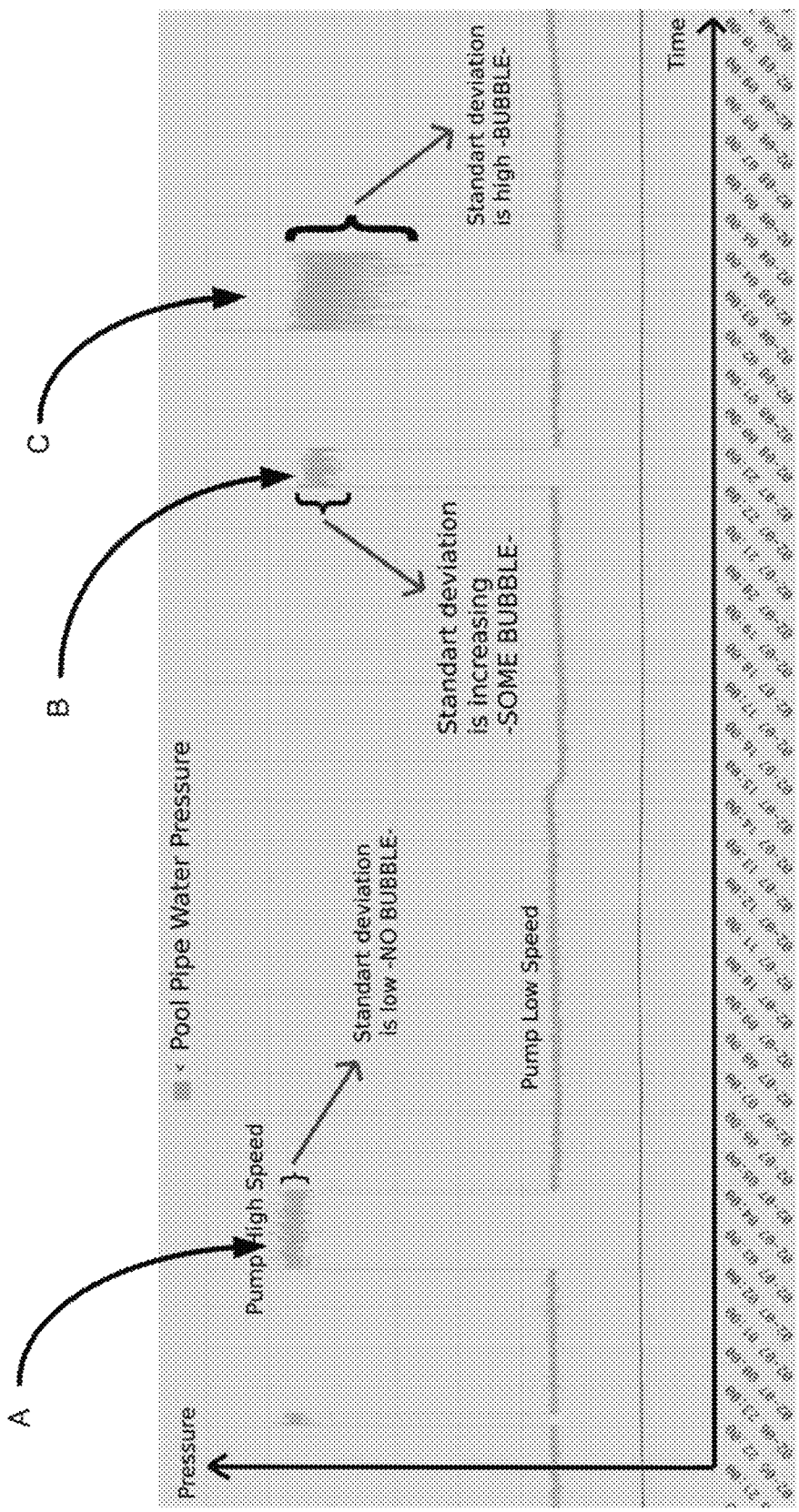
FIG. 4 is an exemplary time versus pressure chart for the pipe.

In one embodiment, the microcontroller 50 receives the pressure sensor data, i.e., local pressure readings. The microcontroller 50 stores the readings in the memory 60 and through the processor 62 which analyzes the data to determine a differential in pressure readings above a preselected amount over a specified time period. FIG. 4 is an exemplary time versus pressure chart for the pipe 14. As shown in FIG. 4, the flow of the fluid is for a pool pipe. In most pool configurations, a pump pumping water through the piper 14 runs at a high speed and low speed. During times of running the pipe at a high speed, bubbles can form which impedes the flow through the pipe. At point A, it is shown a high-speed pressure reading where the pressure readings are shown as being in a close range (identified as the standard deviation in FIG. 4) over a period of time, thereby indicating no or little bubbles. At point B, the range (differential) of pressure readings has a larger ranger (higher standard deviation as compared to point A) which indicates the formation of some bubbles. At point C, other pressure readings are obtained from the pressure sensor 18 where the pressure range (differential) of readings is much higher than either A or B, thereby indicating the presences of even more bubbles.

With reference to FIGS. 1-4, the operation of the detection system 10 will now be explained. First, the pressure sensor 18 is positioned within the interior 34 of the pipe 14. The pressure sensor gathers pressure readings at the location and transmits the pressure readings to the microcontroller 50. The microcontroller, through the processor, is programmable to change parameters for detecting bubbles in the pipe. A series of pressure readings over a period of time is analyzed. A preselected pressure differential range is set for a specific time period and when this preselected pressure differential range is exceeded, the processor determines the presence of bubbles. This preselected pressure differential range (or deviation) over a selected period of time may be determined by the processor based on various parameters (e.g., velocity of flow, size of pipe, type of fluid, etc.) or can be externally selected by the user 44. The present invention may be utilized for any application where the detection of the presence of bubbles or other fluid abnormalities is required. In one application, the present invention may be utilized for detecting bubbles in a swimming pool filtration system. The microcontroller, through the processor 62, calculates the presence of bubbles by determining when the preselected pressure differential range (deviation) of the gathered pressure readings over a selected time period is exceeded. Optional and customizable trigger events may be created and stored within the electronic control unit 16 as desired by the user. The trigger events are fully customizable and allow the user to select a specified range or deviation of the pressure readings for a selected time period. The processed data and customizable trigger events are then sent through the network 40 to other communication devices, such as the mobile phone 42 or some other device, such as a laptop computer, a desktop computer, a tablet, etc. A Message Queuing Telemetry Transport (MOTT) cloud service via the local router 46 may be utilized. The parameters of the program on the microcontroller can also be accessed and modified via the Internet by other computing and/or communication devices.

Figure 5A:
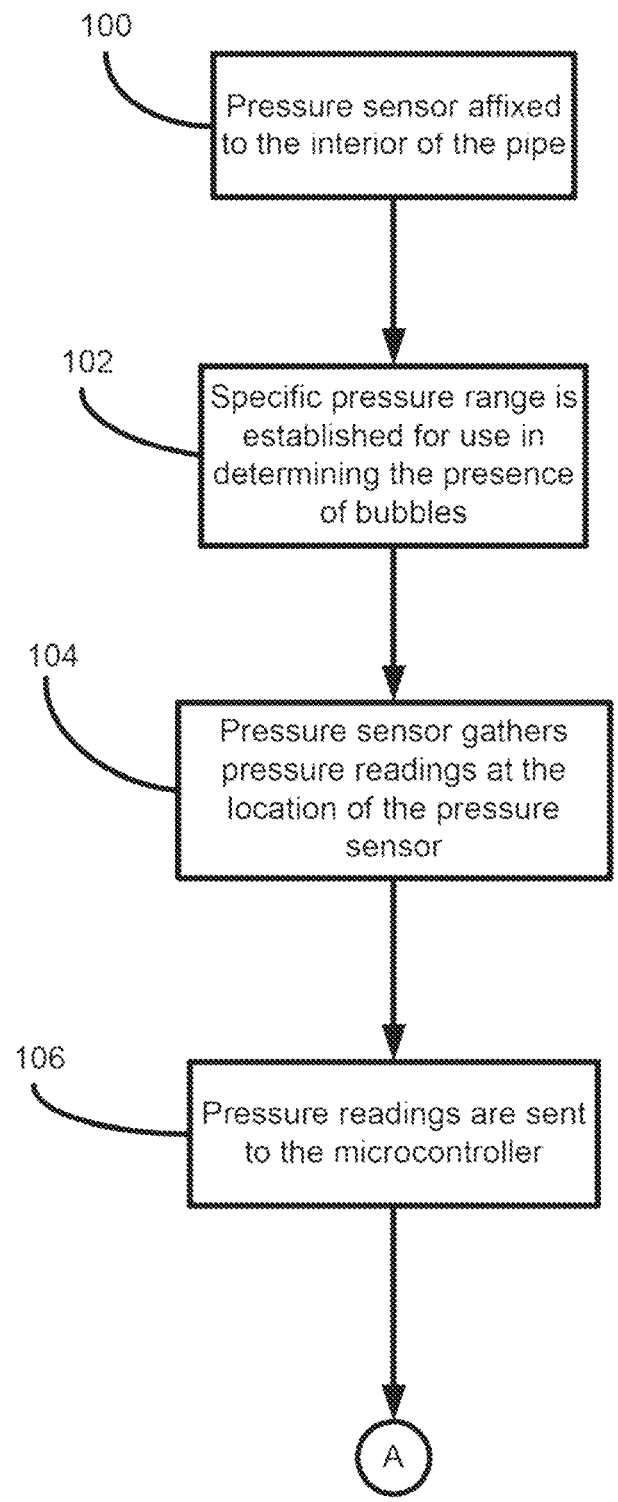
Figure 5B:
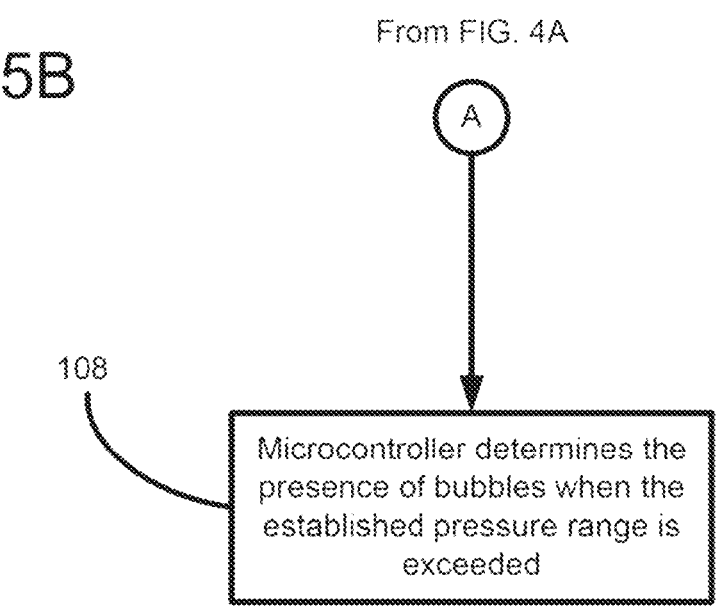

FIGS. 5A and 5B are flow charts illustrating the steps of detecting bubbles in the pipe 14 using the detection system 10 according to the teachings of the present invention. With reference to FIGS. 1-5, the steps of the method will now be explained. The method begins with step 100 where a pressure sensor is affixed to the interior 34 of the pipe 14. Next, in step 102, a specific pressure differential range over a specific time is established which would indicate the presence of bubbles. This specific pressure differential range or deviation is stored in the memory 60 and utilized by the processor 60. Next, in step 104, the pressure sensor gathers pressure readings at the location of the pressure sensor. In step 106, the gathered pressure readings are sent to the microcontroller 50. Next, in step 108, the microcontroller, through the processor 62, calculates the presence of bubbles by determining if the preselected pressure differential range is exceeded. For example, if bubbles were not present in the pipe, the preselected pressure differential range would not be exceeded and the processor 62 would determine that there are no bubbles present in the pipe. However, when bubbles do pass the pressure sensor, the pressure sensor provides pressure readings which have a differential range higher than the preselected pressure differential range, and which would enable the processor 62 to determine that there are bubbles present in the pipe. Optional and customizable trigger events are created and stored within the electronic control unit 16 as desired to provide follow on actions as necessary (e.g., sending alerts to the user through the mobile phone 42). The processed data and customizable trigger events are then sent through the network 40 to other communication devices, such as the mobile phone 42 or some other device such as a laptop computer, a desktop computer, a tablet, etc. A Message Queuing Telemetry Transport (MQTT) cloud service via the local router 46 may be utilized. The parameters of the program on the microcontroller can also be accessed and modified via internet by other computing and/or communication devices.

The present invention provides many advantages over existing systems. The present invention provides a system for detecting bubbles which is accurate and is adaptable to conditions, as necessary. The present invention utilizes pressure readings obtained from one or more pressure sensors. These pressure readings can provide real-time evidence of the presence of bubbles. Additionally, the present invention utilizes a programmable microcontroller which enables a user to easily change the parameters of the detection system without replacing electronic components.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications, and embodiments within the scope of the present invention.

What is claimed is:

1. A system for detecting bubbles within a liquid flowing in an interior of a pipe, the system comprising:
    a pressure sensor affixed to the interior of the pipe;
    a microcontroller communicating with the pressure sensor;
    wherein the pressure sensor gathers pressure readings of the liquid flowing in the pipe at the location of the pressure sensor and sends the gathered pressure readings to the microprocessor;
    wherein a pressure differential range for a specific period of time is selected which when exceeded, indicates the presence of bubbles in the liquid flowing in the pipe;
    wherein the pressure differential range is utilized by the microcontroller to determine the presence of bubbles in the fluid flowing through the pipe;
    wherein the microcontroller determines a presence of bubbles in the liquid based on an exceedance of the pressure differential range from pressure readings gathered by the pressure sensor over the selected period of time.

2. The system according to claim 1 wherein the liquid flowing through the pipe is water.

3. The system according to claim 1 further comprising a communication device communicating with the microcontroller via a network.

4. The system according to claim 3 wherein the communication device provides instruction and receives information from the microcontroller.

5. The system according to claim 1 wherein the microcontroller is programmable for changing parameters for determining the presence of bubbles.

6. The system according to claim 1 wherein the microcontroller executes an action based on the presence of bubbles in the liquid flowing through the pipe.

7. A method of detecting bubbles within a liquid flowing in an interior of a pipe, the method comprising the steps of:
    affixing a pressure sensor to the interior of the pipe;
    gathering pressure readings by the pressure sensor of the liquid flowing in the interior of the pipe;
    sending the gathered pressure readings to a microcontroller;
    establishing a pressure differential range over a specified period of time by which exceedance of the pressure differential range indicates the presence of bubbles; and
    determining, by the microcontroller, a presence of bubbles in the liquid based on the exceedance of the pressure differential range from the gathered pressure readings of the pressure sensor for the preselected period of time.

8. The method according to claim 7 wherein the liquid flowing through the pipe is water.

9. The method according to claim 7 further comprising the step of communicating, by the microcontroller, with a communication device via a wireless network.

10. The method according to claim 9 wherein the communication device provides instruction and receives information from the microcontroller.

11. The method according to claim 7 further comprising the step of executing an action by the microcontroller, based on exceedance of the preselected pressure range from the gathered pressure readings.

\* \* \* \* \*